United States Patent [19]
Pessin

[11] Patent Number: 5,768,785
[45] Date of Patent: Jun. 23, 1998

[54] VERSATILE IMPACT-TYPE HAND TOOL

[75] Inventor: Ray H. Pessin, Hilton, N.Y.

[73] Assignee: Marlin Products & Manufacturing, Inc., Rochester, N.Y.

[21] Appl. No.: 761,565

[22] Filed: Dec. 6, 1996

Related U.S. Application Data

[60] Provisional application No. 60/009,056, Dec. 22, 1995.

[51] Int. Cl.⁶ ....................................................... B25D 3/00
[52] U.S. Cl. .............................. 30/164.6; 173/90; 294/49; 294/57
[58] Field of Search ................................. 30/165.5, 164.6, 30/164.7, 164.8, 308.1; 173/90, 91; 294/49, 57

[56] References Cited

U.S. PATENT DOCUMENTS

| | | |
|---|---|---|
| 454,120 | 6/1891 | Brunton . |
| 530,866 | 12/1894 | Vahouter ................................. 30/164.6 |
| 648,321 | 4/1900 | Westerberg ............................... 294/49 |
| 949,470 | 2/1910 | Geissenhainer et al. ............... 30/164.6 |
| 2,909,385 | 10/1959 | Meredich . |
| 3,036,482 | 5/1962 | Kenworthy et al. . |
| 3,344,863 | 10/1967 | Hastings . |
| 4,241,795 | 12/1980 | Landry, Jr. ................................. 173/90 |
| 4,357,974 | 11/1982 | Nannen ................................... 30/308.1 |
| 4,458,415 | 7/1984 | Maher et al. ........................... 30/164.6 |
| 4,466,188 | 8/1984 | Svendsgaard . |
| 4,926,558 | 5/1990 | Brace ...................................... 30/308.1 |
| 5,435,063 | 7/1995 | Russo ..................................... 30/164.5 |
| 5,496,015 | 3/1996 | Carmien ................................... 294/57 |

FOREIGN PATENT DOCUMENTS

| | | |
|---|---|---|
| 163558 | 7/1949 | Austria . |
| 22630 | 11/1917 | Denmark . |
| 2421036 | 11/1979 | France . |
| 180243 | 4/1906 | Germany . |
| 3233025 | 10/1991 | Japan . |
| 2069914 | 9/1981 | United Kingdom . |
| 2237234 | 5/1991 | United Kingdom ..................... 173/90 |

OTHER PUBLICATIONS

Splitting Spear, Hard–To–Find Tools Catalog, Brookstone Company, Inc., Nashua, NH, 03062, 1995, p. 10.

*Primary Examiner*—Hwei-Siu Payer
*Attorney, Agent, or Firm*—Eugene Stephens & Associates

[57] ABSTRACT

An improved spade-type hand tool incorporates an easily operated impact member which is slidably received on the upper end of the tool handle for acceleration by gravity to generate an impactive force for increasing the efficiency of the tool for chopping ice, roots, hard soil, etc. Attached to the tool's spade-type blade is an inclined-ramp component that serves (a) to lift, separate, and break up material into which the blade is driven, and (b) to increase the effectiveness of the spade tool when it is used for prying or as a lifting wedge.

9 Claims, 1 Drawing Sheet

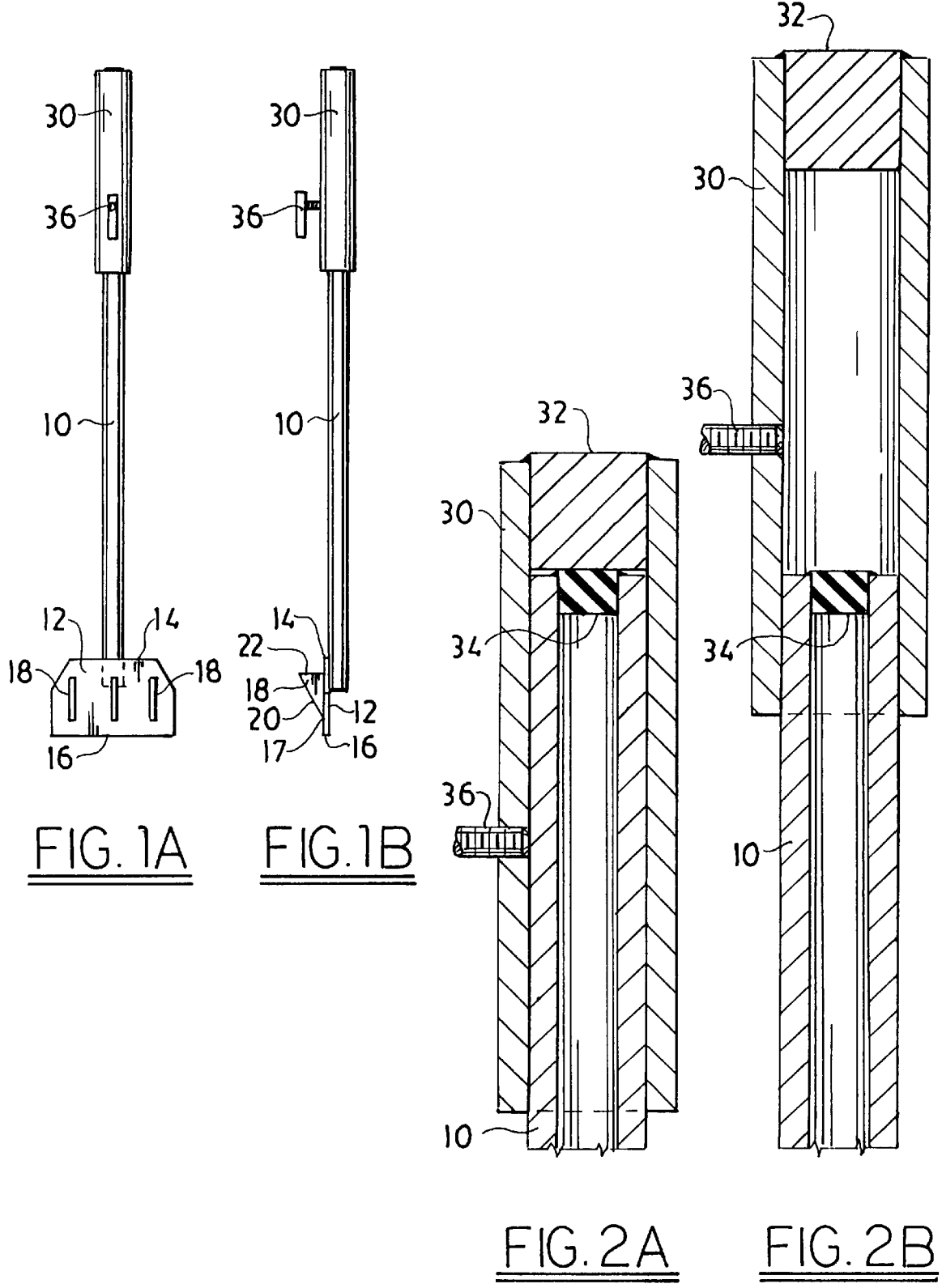

VERSATILE IMPACT-TYPE HAND TOOL

This application claims the benefit of U.S. Provisional Application No. 60/009,056, filed on 22 Dec. 1995, which provisional application is incorporated by reference herein.

TECHNICAL FIELD

This invention relates to hand-operated impact tools used for chopping and wedging up ice, roots, old flooring, etc. and for edging flower beds, walks, driveways, etc.

BACKGROUND

Spade-type tools date back to the earliest civilizations known. The wide, flat blade of the spade is traditionally attached to a long handle for use in cutting straight edges in soil, chopping ice and tree roots, and wedging up objects such as rocks, nailed flooring, etc. Spades usually have an upper edge that extends horizontally when the spade is held vertically, this edge being used to receive the foot of the user to help position and drive the sharper lower edge of the blade.

When used to chop, cut, or pry, it usually takes considerable effort to lift, accelerate, and drive the blade of the spade into the material being worked on; and a significant portion of the repercussion generated as the blade impacts the material is delivered through the handle of the tool to the user's joints and muscles with potentially damaging effect. Further, it is often difficult for the user to properly aim the blade at the ideal point of attack. This difficulty, i.e., trying to aim the blade while lunging with the tool in order to provide it with the required acceleration, can threaten serious injury to the user's feet.

It has also been long known that tools can be driven into soil or other materials by striking the end of the tool with a hammer, rock, or other heavy mass. The impact exerted on the tool by the momentum of the mass, whether such an external mass is swung or merely dropped under the force of gravity, moves the tool with a force often much greater than that which could be otherwise achieved by the hands of the user.

During the first decades of this century, small gravity-accelerated masses were attached to the handles of small hand spades used by military infantrymen for digging slit trenches (see German Patent No. 180243 and Danish Patent No. 22630). More recently, the patent art discloses impact-type hand tools which are designed for a wide variety of uses. In British Patent No. 2 069 914, any one of a plurality of gardening tools may be fitted to an impact handle to be driven by a small gravity-accelerated mass. Also, similar impact-type handles are sold for driving small fence posts, for driving wedge-shaped malls for wood splitting, and (in U.S. Pat. No. 4,466,188) for driving a wedge-shaped tool for removing roof shingles.

It has also been known to attach thin blades perpendicular to the front or rear surfaces of a spade to facilitate breaking up the earth being dug by the spade.

My invention is an improved, safer, easier-to-use spade tool that can facilitate a wide variety of common tasks such as cultivation of hard soils; cutting roots; edging of gardens, walks, drives, etc.; wedging and lifting heavy objects; and, particularly in northern climates, chopping of unwanted ice from stairs, walks, and roofs. My spade tool can be precisely positioned, and then significant momentum is effectively delivered to the working edge of the spade with relatively little effort.

SUMMARY OF THE INVENTION

My improved spade-type hand tool has an elongated handle that incorporates an easily operated impact member and a spade-like blade with an attached inclined-ramp component fixed relative to the front face of the spade-like blade so that the low end of the inclined ramp is in proximity to the bottom edge of the front face and the high end of the inclined ramp is in proximity to the top edge of the front face. The attached inclined-ramp component serves (a) to lift, separate, and break up material into which the blade is driven, and (b) to increase the effectiveness of the spade tool when it is turned over and used for prying or as a lifting wedge.

The attached inclined-ramp component has a substantially triangular profile with two sides of the triangle being substantially longer than a shorter third side and with the longer sides meeting at the low end of the inclined ramp surface in proximity to the bottom edge of the front face. In the preferred embodiment disclosed, the inclined-ramp component comprises a plurality of individual triangular plates extending perpendicularly from the front face of the spade blade, each plate being formed as a right triangle with one long side and a substantially shorter side intersecting at 90° in proximity to the top edge of the front face of the spade blade.

In the disclosed embodiment, when the tool is being used in a generally vertical orientation, the user can place a foot against the perpendicular edges of the three spaced triangular plates to steady the tool during positioning as well as during handle impaction to facilitate accuracy when driving the cutting edge of the spade.

The exposed hypotenuse edges of the three triangular plates act as the surface of an inclined ramp to lift and separate material into which the blade has been driven; and, when the blade of the tool is turned over, the exposed edges of the triangular plates serve as a fulcrum about which the rear face of the blade may be pivoted when the tool is being used as a wedge or pry bar. The triangular plates serve an additional function as well, namely, acting as longitudinal stiffeners for the spade-type blade itself.

The mass component of my invention, which is used to generate the momentum for creating impactive forces on the tool, is incorporated in an impact member which is slidably received over the upper end of the tool handle. As the impact member is slid back and forth over the upper end of the handle, the mass component is moved into and out of contact with a strike-plate fitting fixed to the upper handle end.

A locking fixture, such as a thumb screw, is provided to fix the impact member relative to the handle when the mass component is not being used.

DRAWINGS

FIGS. 1A and 1B are, respectively, front and side views of my impact spade tool.

FIGS. 2A and 2B are enlarged cross-sectional views of the upper end of the handle of the tool shown in FIGS. 1A and 1B, FIG. 2A showing the impact member of the invention at a first location in which its mass component is in contact with the upper end of the handle, and FIG. 2B showing the same apparatus illustrated in FIG. 2A but in a second location in which the mass component has been moved away from the upper end of the handle.

DETAILED DESCRIPTION

Referring to the illustration of my invention in FIGS. 1A and 1B, an elongated handle 10 has a spade-like blade 12 fixed to its 20 lower end. Blade 12 has a top edge 14 and a bottom cutting edge 16. Fixed to and evenly spaced against the front face 17 of blade 12 are three triangular plates 18 that extend perpendicularly from front face 17. Plates 18 serve as an inclined-ramp component, and each plate 18 has a profile preferably formed as a right triangle with two side edges, one substantially longer than the other, intersecting at 90° in proximity to top edge 14 of front face 17 of the spade blade 12. An exposed hypotenuse edge 20 of each triangular plate 18 is positioned with one of its ends in proximity to bottom edge 16 of front face 17, and the longer side edge of each triangular plate 18 is fixed to blade 12. Substantially shorter side edge 22 of each triangular plate 18 extends in a perpendicular direction from front face 17 of blade 12 in proximity to top edge 14 of blade 12.

Hypotenuse edges 20 of plates 18 function together as an inclined-ramp component to lift and separate material into which the blade has been driven; and, when the blade of the tool is turned over, the exposed high points of the triangular plates serve as a fulcrum about which the rear face of the blade may be pivoted when the blade portion of my tool is being used for wedging, prying, or lifting purposes.

Further, as indicated above, perpendicular shorter side edges 22 combine to act as a platform for receiving the foot of a user to facilitate steadying or guiding the position of cutting edge 16, while triangular plates 18 also serve as longitudinal stiffeners for strengthening blade 12 when it is used for cutting or wedging purposes.

An elongated impact member 30 is slidably received over the upper end of handle 10. This portion of the tool is shown in enlarged cross section in FIGS. 2A and 2B. Integrated with the upper end of impact member 30 is a mass component 32; and, in the preferred embodiment, handle 10 is formed from "tubular material" which, as used herein, is intended to identify steel shaped in an elongated hollow format, usually cylindrical or rectangular, for maximizing strength while reducing overall weight. The upper end of handle 10 is closed off with a strike-plate fitting 34. The lower end of impact member 30 is formed so that it can be slidably received in mating relationship over the upper end of handle 10.

In FIGS. 1A, 1B, and 2A, impact member 30 is shown positioned in a first location in which its mass component 32 is in contact with strike-plate fitting 34 of handle 10. A thumb screw 36 acts as a locking fixture which can be engaged (as indicated in FIG. 2A) to prevent relative movement between impact member 30 and handle 10.

When thumb screw 36 is moved to a disengaged position (as indicated in FIG. 2B), impact member 30 can be slidably raised to a second location such as that shown in FIG. 2B. When the tool is positioned so that the upper end of handle 10 is higher than blade 12, impact member 30 can be released from the second location for acceleration by the force of gravity, increasing its momentum until it reaches its first position (as in FIG. 2B) and is stopped by contact of mass component 32 against strike-plate fitting 34. The momentum of this impact is delivered from the upper end of handle 10 to cutting edge 16 of blade 12.

If my tool is being used to chop ice or loosen up hard soil, its proper use is as follows: Cutting edge 16 of blade 12 is positioned against the surface of the ice or soil, thumb screw 36 is loosened, and then impact member 30 is raised to the position indicated in FIG. 2B and released in the manner just described above. This process is repeated, without raising or repositioning blade 12, until the ice or soil in the vicinity of blade 12 is appropriately loosened. As blade 12 is driven into the ice or soil by the repeated impacts of mass component 32 against strike-plate fitting 34, the ramp-like edges of triangular plates 18 lift, separate, and otherwise break up the ice or soil which would otherwise impinge against front face 17 of blade 12. During such repeated impacts, cutting edge 16 is readily retained in its desired position against the ice or soil surface by placing a foot on perpendicular edges 22 of plates 18. Also, since blade 12 and handle 10 are not lifted or driven by the hands and arms of the user during this process, repercussions of the impacts being imparted to cutting edge 16 are not transferred to the user's joints and muscles.

When used for edging or cutting turf (e.g., for replacement or removal), fairly accurate positioning of cutting edge 16 is often desirable; and the positioning of cutting edge 16 is again facilitated by placing a foot on perpendicular edges 22 of plates 18. When using my spade tool for wedging, lifting, or prying, blade 12 is turned over so that ramp-like plates 18 function as inclined planes or as a fulcrum about which bottom edge 16 of blade 12 may be pivoted.

To provide an understanding of the relative size of my hand tool, the disclosed preferred embodiment is manufactured out of cold rolled steel having the following dimensions:

Handle 10 is a 4' (1.2 meter) piece of ¾" (2 cm) square 16 gauge steel, and strike-plate fitting 34 is a 1" (2.5 cm) long plug of solid square steel bar which is appropriately welded to the end of handle 10 along its full cross-sectional perimeter.

Spade-like blade 12 is a trimmed rectangle of 11 gauge steel with the width of cutting edge 16 being 8" (20 cm), and the height of blade 12, i.e., between top edge 14 and cutting edge 16, is 6" (15 cm).

Each triangularly-edged plate 18 is also cut from 11 gauge steel with upper perpendicular edge 22 being 2.25" (5.6 cm), and with the edge fixed to the rear face of blade 12 having a length of 4.75" (12 cm).

Impact member 30 is a 15" (37.5 cm) length of 11 gauge steel tubing having an outside diameter of 1.25" (3.1 cm), and mass component 32 comprises a solid cylinder of 1" (2.5 cm) diameter steel rod having a length of 3" (7.5 cm), being appropriately welded to the end of impact member 30 along its full cross-sectional circumference.

Impact member 30 has a mass of approximately 2.5 pounds (1.12 kg) which, when released from the second location illustrated in FIG. 2B, is accelerated by gravity through a distance of approximately 1' (30 cm) upon its return to the first location against strike-plate fitting 34 of handle 10 as illustrated in FIG. 2A.

When my tool is held in a vertical position, the momentum achieved by impact member 30 is quite significant in regard to the efficiency of my tool for chopping through several inches of ice, roots, or hard soil; and even a small person can easily generate this significant impact with relative ease by merely raising impact member 30 to its second location and releasing it so that it falls back against the upper end of handle 10. As indicated above, since blade 12 and handle 10 are not raised during this impactive process, the repercussions of the impacts are not delivered to the user's body.

My invention can also be used to carefully and exactly cut and raise sod, either for replanting or for neat removal; and when small roots [e.g., having diameters as large as 2 inches (5 cm)] are encountered during the digging of holes, they can be easily and accurately cut with this just-disclosed tool.

Also, when used with a block of wood beneath bottom edge 16, the tool can be used to pack or tamp dirt or replanted sod.

Further, as indicated above, when the spade blade of my impact hand tool is turned over, it has been found very effective for raising old roofing shingles and old tiling from roofs as well as from floors.

Most importantly, since blade 12 of my impact spade is easily positioned (particularly, with the help of the user's foot) in the exact location desired for chopping, cutting, or prying, and since the tool is then easily driven with powerful efficiency without having to raise or lower blade 12 from its exactly located position, the user is not required to lift and lunge toward the work, thereby avoiding muscle/joint strain and risk of potentially serious injury.

I claim:

1. An impact-operated hand tool comprising:

an elongated handle having a length of a preselected first dimension and having a lower end and an upper end;

an elongated impact member having a length of a preselected second dimension that is shorter than said preselected first dimension and having its own respective lower and upper ends, said upper end of said impact member being integrated with a mass component and said lower end of said impact member being formed to be slidably received in mating relationship over the upper end of said handle;

said impact member, when received over said handle, being slidably movable between (a) a first location in which said mass component is in contact with said upper end of said handle and (b) a second location in which said mass component is not in contact with said upper end of said handle so that said impact member may be moved from said second location to said first location to cause said mass component to strike said upper end of said handle; and a spade-like blade fixed to the lower end of said handle, said spade-like blade having:

respective front and rear faces with respective top and bottom edges, and an inclined-ramp component (a) having a low end and a high end and (b) being fixed relative to said front face of said spade-like blade so that said low end of said inclined-ramp component is in proximity to said bottom edge of said front face and said high end of said inclined-ramp component is in proximity to said top edge of said front face.

2. The hand tool of claim 1 wherein said inclined-ramp component has a substantially triangular profile with two sides of said triangular profile being substantially longer than a third shorter side, said longer sides meeting at said low end of said inclined-ramp component in proximity to said bottom edge of said front face.

3. The hand tool of claim 2 wherein said substantially triangular profile is in the form of a right triangle with one of said longer sides and said shorter side intersecting at 90° in proximity to said top edge of said front face.

4. The hand tool of claim 3 wherein said inclined-ramp component comprises a plurality of individual plates, each said plate (a) extending perpendicular to said front face of said blade, (b) having the same said triangular profile, and (c) being fixed to said front face with an edge of said plate forming said shorter side of said right triangle extending in a substantially perpendicular direction in proximity to said top edge of said front face.

5. The hand tool of claim 1 wherein, when the upper end of said handle is positioned higher than the lower end of said handle, said impact member can be moved to said second location and be released to move to said first location by the force of gravity.

6. The hand tool of claim 1 wherein said upper end of said handle has a strike-plate fitting positioned to contact said mass component of said impact member whenever said latter member is moved to said first location.

7. The hand tool of claim 6 wherein said handle is formed from tubular material and said strike-plate fitting comprises a solid plug-like element.

8. The hand tool of claim 1 wherein said impact member further comprises a locking fixture movable between (a) a disengaged mode in which said impact member is free to slide relative to said handle and (b) an engaged mode in which said impact member is fixed relative to said handle.

9. The hand tool of claim 1 wherein said impact member is formed from tubular material and said mass component comprises a solid plug-like element.

* * * * *